(12) United States Patent
Mildren et al.

(10) Patent No.: US 9,658,513 B2
(45) Date of Patent: May 23, 2017

(54) DEVICE AND METHOD FOR CONVERTING A LIGHT AND A LASER SYSTEM

(71) Applicant: Macquarie University, North Ryde (AU)

(72) Inventors: Richard Paul Mildren, Abbotsford (AU); Ondrej Kitzler, Eastwood (AU)

(73) Assignee: Macquarie University, North Ryde (AT)

(*) Notice: Subject to any disclaimer, the term of this patent is extended or adjusted under 35 U.S.C. 154(b) by 83 days.

(21) Appl. No.: 14/395,751

(22) PCT Filed: Apr. 19, 2013

(86) PCT No.: PCT/AU2013/000406
§ 371 (c)(1),
(2) Date: Oct. 20, 2014

(87) PCT Pub. No.: WO2013/155568
PCT Pub. Date: Oct. 24, 2013

(65) Prior Publication Data
US 2015/0085348 A1     Mar. 26, 2015

Related U.S. Application Data

(60) Provisional application No. 61/635,977, filed on Apr. 20, 2012.

(51) Int. Cl.
| | | |
|---|---|---|
| G02F 1/35 | (2006.01) | |
| G02F 1/355 | (2006.01) | |
| H01S 3/30 | (2006.01) | |
| G02F 1/365 | (2006.01) | |
| H01S 3/00 | (2006.01) | |
| H01S 3/081 | (2006.01) | |
| H01S 3/083 | (2006.01) | |
| H01S 3/094 | (2006.01) | |
| H01S 3/109 | (2006.01) | |
| H01S 3/042 | (2006.01) | |

(52) U.S. Cl.
CPC ............ *G02F 1/353* (2013.01); *G02F 1/3534* (2013.01); *G02F 1/3551* (2013.01); *G02F 1/365* (2013.01);
(Continued)

(58) Field of Classification Search
CPC ........ G02F 1/353; G02F 1/3534; G02F 1/355; G02F 1/3551; H01S 3/0092
(Continued)

(56) References Cited

U.S. PATENT DOCUMENTS

| | | | |
|---|---|---|---|
| 5,673,281 A | 9/1997 | Byer | |
| 5,796,761 A * | 8/1998 | Injeyan | ..................... H01S 3/30 359/327 |

(Continued)

FOREIGN PATENT DOCUMENTS

| | | |
|---|---|---|
| WO | WO-2006/058381 A1 | 6/2006 |
| WO | WO-2011/103630 A1 | 9/2011 |

OTHER PUBLICATIONS

Kitzler, O. et al. "CW Diamond Laser Architecture for High Average Power Raman Beam Conversion." *2011 International Quantum Electronics Conference (IQEC) and Conference on Lasers and Electro-Optics (CLEO) Pacific Rim Incorporating the Australasian Conference on Optics, Lasers and Spectroscopy and the Australian Conference on Optical Fibre Technology* (2011): 1173-175.

Lin, J. et al. "Continuous-wave VECSEL Raman Laser with Tunable Lime-yellow-orange Output." *Opt. Express Optics Express* 20.5 (2012): 5219-5224.

(Continued)

*Primary Examiner* — Daniel Petkovsek
(74) *Attorney, Agent, or Firm* — Wolf, Greenfield & Sacks, P.C.

(57) ABSTRACT

Disclosed herein is a device (10) for converting a light (12) received thereby. The device (10) comprises a resonating structure (14) comprising a Raman medium. The resonating structure is arranged to resonate Raman light (18) generated by a Raman interaction between the Raman medium and the light (12) when so received.

29 Claims, 10 Drawing Sheets

(52) U.S. Cl.
CPC .............. *H01S 3/0092* (2013.01); *H01S 3/30* (2013.01); *H01S 3/042* (2013.01); *H01S 3/083* (2013.01); *H01S 3/0816* (2013.01); *H01S 3/094038* (2013.01); *H01S 3/109* (2013.01)

(58) Field of Classification Search
USPC ........................................................ 359/327
See application file for complete search history.

(56) References Cited

U.S. PATENT DOCUMENTS

| | | | |
|---|---|---|---|
| 8,345,717 B2* | 1/2013 | Dekker | H01S 3/1086 372/20 |
| 9,017,633 B2* | 4/2015 | Friel | C30B 25/02 117/101 |
| 2005/0163169 A1 | 7/2005 | Lawandy et al. | |

OTHER PUBLICATIONS

Lubeigt, W. et al. "16 W Continuous-wave Raman Laser Using Low-loss Synthetic Diamond," *Opt. Express Optics Express* 19.7 (2011): 6938-944.

Mildren, R. et al. "Solid-state Raman laser generating discretely tunable ultraviolet between 266 and 320nm." *Optics Letters* 32.7 (2007): 814-16.

Ding. Shuanghong et al. "Numerical optimization of the extracavity Raman laser with barium nitrate crystal" Science Direct, Optics Communications 267 (2006) 480-486.

* cited by examiner

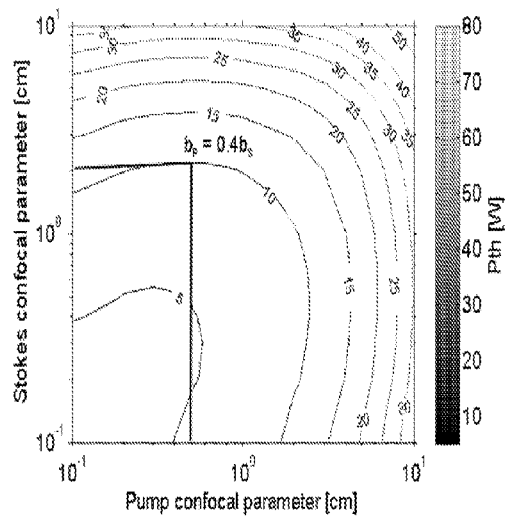
Figure 18
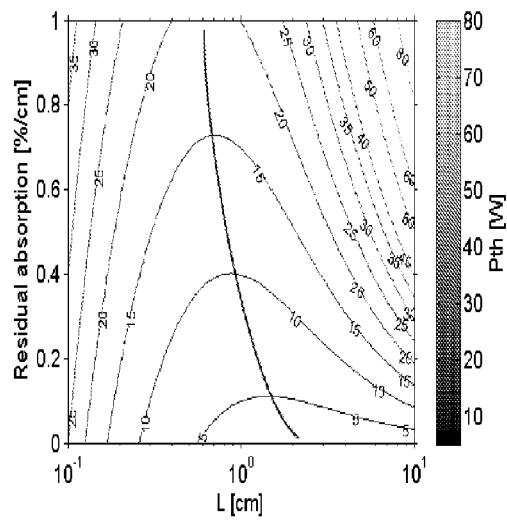
Figure 19
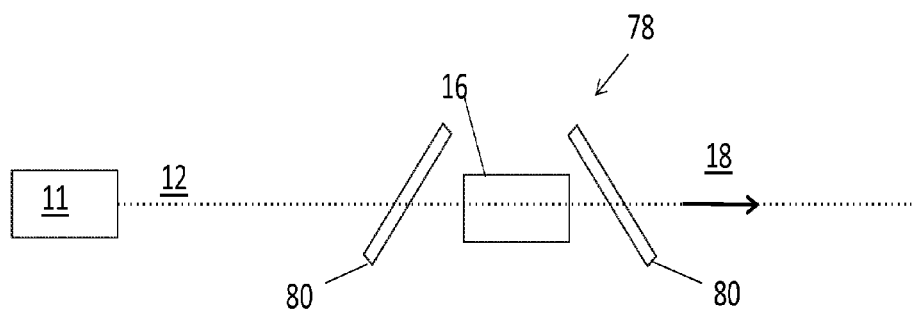
Figure 20
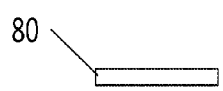

DEVICE AND METHOD FOR CONVERTING A LIGHT AND A LASER SYSTEM

CROSS REFERENCE TO RELATED APPLICATIONS

This application is a U.S. national phase application claiming the priority benefit under 35 U.S.C. §371 to Patent Cooperation Treaty Application no. PCT/AU2013/000406, which was filed on Apr. 19, 2013 and which claims priority to Provisional Patent Application No. 61/635,977, which was filed on Apr. 20, 2012. The disclosure of each document referenced in this paragraph is incorporated herein by reference in its entirety.

TECHNICAL FIELD

The disclosure herein generally relates to devices for converting a light received thereby, related laser systems, and related methods for converting a light, and particularly but not exclusively to devices, systems and methods for converting a received light to a high power infrared light using stimulated Raman scattering.

BACKGROUND

High power continuous wave light generation at wavelengths different from rare-earth ions (examples of which include but are not limited to Nd, Yb, Er, Ho, Tm) laser lines and their harmonics remains a challenge for current solid-state lasers. Some have approached this challenge by using nonlinear frequency conversion in optical parametric oscillators (OPOs). The prospects for greatly increasing the output power from OPOs, however, may be limited because thermal loading of the nonlinear crystals may result in phase-mismatch and damage. Continuous wave (cw) Raman fibre lasers offer high output powers of 150 W or more at wavelengths different from the laser lines of rare earth doped lasers and their harmonics. Raman fibre laser technology may not be used to shift harmonics of rare earth doped lasers because fibre components, for example integrated fibre grating mirrors, may be very difficult to achieve for high power lasers and due to cumulative damage effects in the fibre such as photodarkening. Subsequent harmonic conversion and/or narrow line width output may be problematic, however, especially in the presence of strong stimulated Brillouin scattering.

Laser systems having within a resonating structure a doped crystalline gain medium and a Raman medium to convert a native frequency of the doped crystalline gain medium have been demonstrated. Increasing the power from these laser systems, for example during continuous wave or quasi-continuous wave operation at infrared wavelengths, has been problematic.

SUMMARY

Disclosed herein is a device for converting a light received thereby. The device comprises a resonating structure comprising a Raman medium. The resonating structure is arranged to resonate Raman light generated by a Raman interaction between the Raman medium and the light when so received.

Disclosed herein is a device for converting a light received thereby. The device comprises a resonating structure comprising a Raman medium having a thermal conductivity of greater than 2 W/K/m. The resonating structure is arranged to resonate Raman light generated by a Raman interaction between the Raman medium and the light when so received. The resonating structure is arranged to lose less than 5% of the resonating Raman light's energy in a resonance cycle period of the resonating structure.

An embodiment comprises an input optical port. The input optical port may be for ingress of the light when so received into the resonating structure.

An embodiment of the device may be able to generate more Raman light than prior art devices. The thermal conductivity being greater than 2 W/K/m may dissipate the heat generated within the Raman medium during the generation of Raman light, especially but not necessarily of relatively greater power.

In an embodiment, the Raman light is an infrared light. The resonating structure may be arranged to resonate the infrared Raman light. The gain of the Raman interaction generally decreases with increasing Raman light wavelength. For example, for a given focal spot area at the Raman medium, more light may be needed for infrared Raman light generation than visible Raman light generation. Consequently, the heat generated during infrared Raman light generation may be greater than the heat generated during shorter wavelength Raman light generation. Consequently, infrared Raman light generation may be associated with engineering challenges including relatively strong thermal lens generation, induced birefringence and Raman light loss, and increased probability of thermally induced Raman medium fracture.

The Raman medium may be barium tungstate. Barium tungstate may have a thermal conductivity of 2.3 W/K/m. The thermal conductivity quoted herein may be for a temperature of the Raman media being 320 K.

A greater thermal conductivity of the Raman medium may result in greater heat dissipation facilitating the generation of a greater Raman light power, or the generation of Raman light at wavelengths previously unattainable. The thermal conductivity may be greater than 5 W/m/K. The Raman medium may be a vanadate material such as yttrium vanadate or gadolinium vanadate. The vanadate may have a thermal conductivity of 5.2 W/K/m. The thermal conductivity may be greater than 100 W/m/K. The Raman medium may be silicon. Silicon may have a thermal conductivity of 153 W/m/K. The thermal conductivity may be greater than 1800 W/m/K. The Raman medium may be diamond. Diamond may have a thermal conductivity between 1000 W/m/K and 3000 W/m/K or greater, depending on diamond quality.

Some applications of the Raman light would benefit from continuous wave Raman light (that is, the light and so the Raman light is continuous for greater than 1 s) or quasi-continuous wave Raman light (that is, the light and so the Raman light is continuous for greater than 1 µs). In these cases, the peak power of the light may be limited by the availability of light sources of suitable power and the thermal load capacity of the Raman medium, which in turn limits the gain of the Raman interaction. Having a resonating structure arranged to lose less than 5% of the resonating Raman light's energy in a resonance cycle period (that is, the time required for Raman light to make a round trip) of the resonating structure may enable the generation of continuous wave or quasi continuous wave Raman light. Reducing the loss may accommodate lower gain levels at longer Raman light wavelengths, for example. The resonating structure may be arranged to lose less than 2% of the resonating Raman light's energy in a resonance cycle period. The resonating structure may be arranged to lose less than 1.5% of the resonating Raman light's energy in a resonance cycle period. The resonating structure may be arranged to lose less than 1% of the resonating Raman light's energy in a resonance cycle period. The resonating structure may be arranged to lose less than 0.2% of the resonating Raman light's energy in a resonance cycle period.

In an embodiment, the Raman medium has at least one of absorption and scattering losses that reduce the resonating Raman light's power by less than 2% when passed therethrough. Reducing the Raman medium loss may result in the generation of more Raman light or longer light wavelengths, especially continuous wave or quasi continuous wave Raman light. The Raman medium may have at least one of absorption and scattering losses that reduce the resonating Raman light's power by less than 1% when passed therethrough. The Raman medium may have at least one of absorption and scattering losses that reduce the resonating Raman light's power by less than 0.5% when passed therethrough. The Raman medium may have at least one of absorption and scattering losses that reduce the resonating Raman light's power by less than 0.1% when passed therethrough.

In an embodiment, the resonating structure has a Raman light optical port configured for the egress of less than 2% of the resonating Raman light's energy in the resonance cycle period. The resonating structure may have a Raman light optical port configured for the egress of less than 1% of the resonating Raman light's energy in the resonance cycle period. The resonating structure may have a Raman light optical port configured for the egress of less than 0.5% of the resonating Raman light's energy in the resonance cycle period. The resonating structure may have a Raman light optical port configured for the egress of less than 0.1% of the resonating Raman light's energy in the resonance cycle period.

An embodiment of the device comprises a plurality of spaced apart reflecting surfaces. The resonating structure may comprise the spaced apart reflecting surfaces. Each of the plurality of reflecting surfaces may be at a respective end of the resonating structure. At least some of the plurality of reflecting surfaces may be concave. The resonating structure may comprise a hemispherical resonator. All of the plurality of reflecting surfaces may be concave. The resonating structure may comprise a concentric or near concentric resonator. The resonating structure may generally comprise any suitable resonating structure, for example a photonic crystal or Bragg grating structure. Alternatively, the resonating structure may comprise a ring resonator.

In an embodiment, the Raman interaction generates an average thermal load in the Raman medium of greater than at least one of 0.1 W, 1 W, 3 W, 10 W and 100 W.

In an embodiment, the Raman medium has a thermal expansion coefficient of less than at least one of $10 \times 10^{-6}$ $K^{-1}$, $5 \times 10^{-6}$ $K^{-1}$, and $2 \times 10^{-6}$ $K^{-1}$.

In an embodiment, the Raman medium is crystalline and comprises at least one element of Group IV of the periodic table. The Raman medium may comprise carbon. The Raman medium may comprise silicon. The silicon may be crystalline silicon. The Raman medium may comprise diamond. The device may be arranged for the Raman light when so generated to propagate along a <110> axis of the diamond. The device may be arranged for a polarisation vector of the Raman light to be aligned with a <111> axis of the diamond. The device may be arranged for the Raman light when so generated to propagate along any direction in the diamond perpendicular to a <111> direction, and with the polarisation vector of the Raman light to be aligned with a <111> axis of the diamond. Alternatively or additionally, the Raman medium comprises at least one of a tungstate crystal, a molybdenate crystal, and a vanadate crystal.

In an embodiment, the light has a wavelength greater than 900 nm. The Raman medium may have a Raman gain coefficient greater than 3 cm/GW. The Raman medium may have a Raman gain coefficient greater than 8 cm/GW.

In an embodiment, the light has an average power greater than 10 W. The light may have an average power greater than at least one of 30 W, 50 W, 100 W and 1000 W.

In an embodiment, the light has a peak power per unit area of less than 160 MW/cm$^2$ at the Raman medium. This is generally considered to be the diamond damage threshold for cw incident light having a wavelength of 10.6 µm. The damage threshold depends on diamond bulk and surface quality. The damage threshold may scale with $t_p^{0.25} \cdot w_0^{0.5}$ where $t_p$ is the pulse duration and $w_0$ the beam spot radius incident on the surface.

In an embodiment, the resonating structure has a nonlinear medium arranged for interacting with at least one of the light and the Raman light to generate another light. The nonlinear medium may comprise a second order nonlinear medium. The second order nonlinear medium may comprise a crystal of, for example, beta barium borate, cesium lithium borate, bismuth borate, lithium triborate, lithium iodate, lithium niobate, gallium selenide, and potassium titanyl phosphate, or generally any suitable material. The second order nonlinear medium may be periodically polled. The resonating structure may have another light optical port arranged to pass at least 50% of the other light. The nonlinear medium may be another Raman medium or any suitable nonlinear medium. The nonlinear medium may be configured to phase match output at the second harmonic of a Raman light, or the sum or difference frequency of a Raman light with the received light. The nonlinear medium may include a tuner to enable the user to select amongst the at least one of second harmonic, sum or difference frequencies. The tuner may control the temperature or angle of the nonlinear medium.

In an embodiment the light is a green light and the other light is an ultraviolet light.

In an embodiment, the device comprises a Raman material cooling element thermally coupled to the Raman material.

In an embodiment, the resonating structure comprises a reflective coating on at least one surface of the Raman material. The resonating structure may comprise a plurality of reflective coatings on a plurality of surfaces of the Raman material.

In an embodiment, the length of the path of the Raman light through the Raman medium is 2 mm to 20 mm. The length of the path of the Raman light through the Raman medium may be 7 mm to 10 mm.

In an embodiment, the diameter of the light is 0.5 to 0.7 times smaller than the diameter of the Raman light within the Raman medium.

An embodiment comprises a Raman medium translator operable to translate to the Raman medium to control the effect of Raman medium birefringence on the Raman light.

Disclosed herein is a laser system comprising a device in accordance with the above disclosure and a source of the light. The device and the source of the light are cooperatively arranged for the device to receive the light.

In an embodiment, the source of the light comprises at least one of a gas laser, a laser having neodymium ions, a laser having ytterbium ions, a laser having holmium ions, a laser having thulium ions, a laser having erbium ions, a tunable laser, a fibre laser, a laser having a solid state laser medium, a laser having a bulk crystalline medium, a narrow line width laser, a diode laser, an optically pumped semiconductor laser, a diode pumped alkali vapour laser, a chemical laser and a tapered diode laser. The source of light may include a nonlinear material to convert it's light to a harmonic such as a second, third or fourth harmonic. Any suitable source of light may be used.

In an embodiment, the source of the light comprises neodymium ions. The source of the light may be arranged to generate the light in the form of a beam. The source of the light may be arranged to generate light having a wavelength of 1064 nm. The source of the light may be arranged to generate light in a linearly polarised state. The source of the light may be arranged to generate light having a $M^2$ value of less than 2. The source of the light may be arranged to generate light having an average power greater than at least one of 1, 5, 10, 30, 50, 100, and 1000 W.

In an embodiment, the light source comprises a telescope configured to expand the beam. The light source may comprise a light attenuator. The light source may comprise an optical isolator.

The light source may comprise a linear polarisation rotator. The light source may comprise a focusing lens.

In an embodiment, the light source is arranged to provide light that is continuous for at least 1 µs. The light source may be arranged to provide light that is continuous for at least 1 s.

In an embodiment, the light source is arranged to provide light having a line width of full width half maximum of less than at least one of 2.0 cm$^{-1}$, 1.5 cm$^{-1}$, 1.0 cm$^{-1}$ and 0.5 cm$^{-1}$. Alternatively, the light source may be arranged to provide light having a line width of full width half maximum of less than 10 cm$^{-1}$.

Disclosed herein is a method for converting a light. The method comprises the step of interacting the light with a Raman medium to generate a Raman light. The method comprises the step of resonating the Raman light generated.

Disclosed herein is a method for converting a light. The method comprises the step of interacting the light with a Raman medium to generate a Raman light. The Raman medium has a thermal conductivity of greater than 2 W/K/m. The method comprises the step of resonating the Raman light generated. Less than 5% of the energy of the resonating Raman light is lost in a resonance cycle period of the resonating Raman light.

An embodiment comprises the step of the ingress of the light into a resonating structure having the Raman medium. The Raman light generated may resonate in the resonating structure.

In an embodiment, less than 5% of the energy of the resonating Raman light is lost in a resonance cycle. Less than 2% of the energy of the resonating Raman light may be lost in a resonance cycle. Less than 1.5% of the energy of the resonating Raman light may be lost in a resonance cycle. Less than 1% of the energy of the resonating Raman light may be lost in a resonance cycle. Less than 0.2% of the energy of the resonating Raman light may be lost in a resonance cycle.

In an embodiment, the method comprises the step of passing the Raman light through the Raman medium that may cause at least one of scattering and absorption losses that may remove less than 2% of the Raman light's power. The step of passing the Raman light through the Raman medium may cause at least one of scattering and absorption losses that may remove less than 1% of the Raman light's power. The step of passing the Raman light through the Raman medium may cause at least one of scattering and absorption losses that may remove less than 0.5% of the Raman light's power. The step of passing the Raman light through the Raman medium may cause at least one of scattering and absorption losses that may remove less than 0.1% of the Raman light's power.

An embodiment of the method comprises the step of generating an average thermal load in the Raman medium of greater than at least one of 0.1 W, 1 W, 3 W, 10 W and 100 W.

In an embodiment, the Raman medium is crystalline and comprises at least one element of Group IV of the periodic table. The Raman medium may comprise carbon. The Raman medium may comprise diamond. The Raman medium may comprise silicon.

In an embodiment, the light has a wavelength greater than 900 nm. The Raman medium may have a Raman gain coefficient greater than 3 cm/GW. The Raman medium may have a Raman gain coefficient greater than 10 cm/GW for the light.

In an embodiment, the light has an average power greater than 5 W. The light may have an average power greater than 10 W. The light may have an average power greater than 20 W. The light may have an average power greater than 50 W. The light may have an average power greater than 100 W. The light may have an average power greater than 1000 W.

In an embodiment, the light has a peak power per unit area of less than 160 MW/cm$^2$ at the Raman medium.

In an embodiment, the light is continuous for at least 1 µs. The light may be continuous for at least 1 s.

An embodiment of the method comprises the step of interacting at least one of the resonating Raman light and the light with second order nonlinear medium to generate another light.

An embodiment comprises the step of removing heat from the Raman medium using a Raman material cooling element.

In an embodiment, the length of the path of the Raman light through the Raman medium is 2 mm to 20 mm. The length of the path of the Raman light through the Raman medium may be 7 mm to 10 mm.

In an embodiment, the diameter of the light is 0.5 to 0.7 times smaller than the diameter of the Raman light within the Raman medium.

An embodiment comprises the step of translating the Raman medium to control the effect of Raman medium birefringence on the Raman light.

In an embodiment, the resonating structure is a ring resonator.

Where possible, any features of the above disclosed devices, laser systems, and methods may be combined.

BRIEF DESCRIPTION OF THE FIGURES

Embodiments will now be described by way of example only with reference to the accompanying figures in which:

FIG. 18 shows a plot of threshold as a function of pump and Stokes Confocal parameters for an example model.

FIG. 19 shows a plot of threshold as a function of diamond residual absorption and length, and optimal crystal length, for an example model.

FIG. 20 shows another embodiment where the resonating structure comprises a ring resonator.

DESCRIPTION OF EMBODIMENTS

Figure 1:
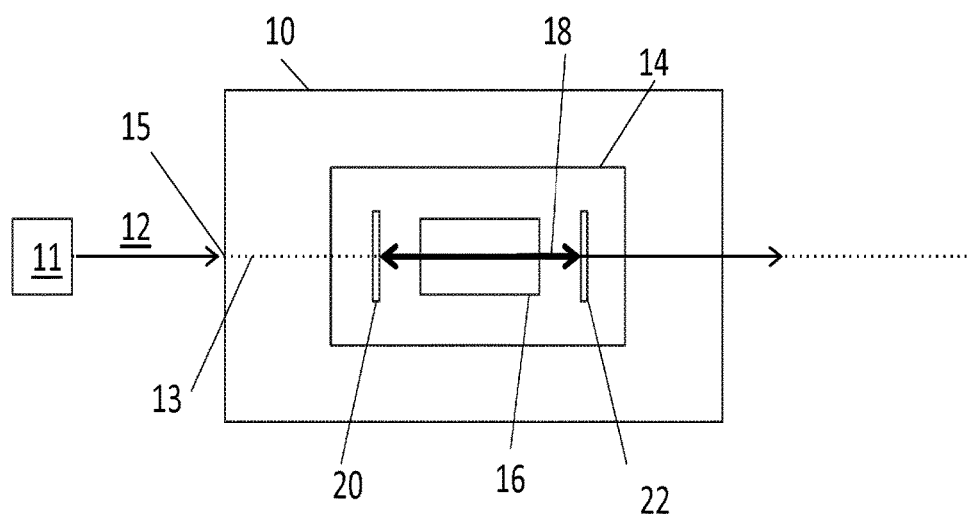
FIG. 1 is a schematic diagram of an embodiment of a device for converting a light received thereby.

FIG. 1 shows an embodiment of a device for converting light 12 received thereby, the device being generally indicated by the numeral 10. The light 12 is generated by a light source 11 in the form of a continuous wave rare earth ion doped laser, specifically a laser having a neodymium doped yttrium aluminium garnet crystal, although any suitable light source may be used. In another embodiment, the laser has a neodymium doped vanadate crystal. The device 10 and the light source 11 are cooperatively arranged for the device to receive the light 12. That is, in this but not necessarily in all embodiments, the beam output of the light source 11 is aligned with an optical axis 13 at an input optical port 15 of the device.

The device 10 comprises a resonating structure 14. The resonating structure has a Raman medium 16. The resonating structure 14 is arranged to resonate Raman light 18 generated by a Raman interaction between the Raman medium 16 and the light 12 when received. The Raman interaction comprises, in this embodiment, stimulated Raman scattering. The Raman light may comprise at least one of a first Stokes, a second Stokes, and a Stokes of a higher order (e.g. third Stokes) than the second Stokes. The Raman medium, in this but not necessarily in all embodiments, has a thermal conductivity of greater than 2 W/K/m. This thermal conductivity may, however, be anywhere up to 3000 W/m/K or greater, depending on the chosen Raman medium 16. Suitable Raman medium may include any one of vanadate, silicon, tungstate, molybdenate and diamond for example. Generally, but not necessarily, a Raman medium having a higher thermal conductivity may mitigate the adverse effects of heat generated therein. Generally, a Raman medium having a higher thermal conductivity is suitable for continuous or quasi-continuous wave Raman light generation, especially at, but not necessarily limited to, infrared and mid infrared wavelengths. Generally, but not necessarily, a Raman medium having a higher thermal conductivity is suitable for higher average power Raman light generation.

During use, heat is generated in the Raman medium by the inelastic stimulated Raman scattering process and in some embodiments also from parasitic absorption (e.g. due to crystal impurities, colour centres and defects, etc). A Raman medium cooling element may, but not necessarily, be thermally coupled to the Raman medium to remove heat generated within the Raman medium. For example, the Raman medium may be mounted on a heat sink. The heat sink may be a copper block. Indium foil or any heat conductive solder or paste may be sandwiched between the Raman medium and the heat sink to provide a good thermal contact. The heat sink may have fluid channels therethrough and a fluid, for example water or air, moved through the channels to remove the heat transferred to the heat sink. Alternatively or additionally, the heat sink may have fins for air cooling. The heat sink may be fan cooled. Generally any suitable Raman medium cooling element may be used.

In this embodiment, the resonating structure 14 is arranged to lose less than 5% of the resonating Raman light energy in a resonance cycle period of the resonating structure 14. The resonance cycle period of the resonating structure is the time taken for a photon of the resonating Raman light to make a round trip within the light resonating structure 14. This loss includes, for example, the loss of any mirrors of the resonating structure, and any medium of the resonating structure including the Raman medium 16. Mirrors and crystals of sufficient quality may be used. A loss of less than 5% may facilitate continuous wave or quasi-continuous wave Raman light generation, especially at infrared and mid-infrared wavelengths where the Raman gain is relatively low. For example, the applicant's have formed the view that it may be difficult or impossible to obtain efficient operation using a resonating structure having loss greater than 5% per resonance cycle period for continuous wave or quasi continuous wave Raman light generation.

Figure 5:
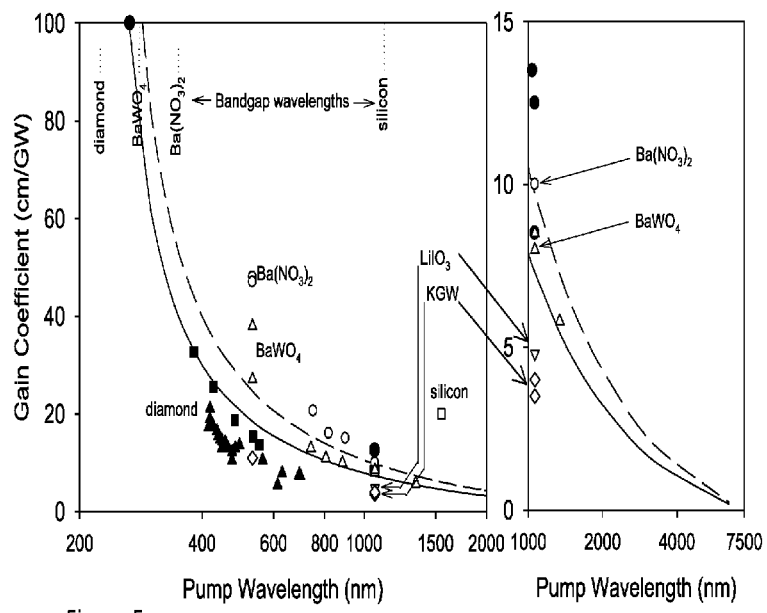
FIG. 5 shows a graph of the dependence of Raman gain on the wavelength of the light for various Raman medium.

FIG. 5 shows a graph of the dependence of Raman gain on the wavelength of the light ("pump") for various Raman medium. In particular, the wavelength dependence of selected gain coefficients for diamond for the pump polarization parallel to a <110> crystal direction is indicated by solid symbols, barium nitrate is indicated by hollow circles, barium tungstate is indicated by hollow triangles, silicon is indicated by hollow squares and potassium gadolinium tungstate is indicated by hollow diamonds. The solid squares are values obtained from fits to the nonlinear dispersion of CARS around the Raman frequency. The solid triangles show the coefficients determined from spontaneous scattering and using $T_2=7$ ps except for the point at 694 nm which was determined in using $T_2=5.2$ ps (2.04 $cm^{-1}$). The solid circles show coefficients obtained from measurements of SRS threshold. The solid line shows a theoretical prediction $g_s(<110>)$. The dashed line is the theoretical $g_s$ for the pump parallel to a <111> crystal direction and is 1⅓ times the solid line. At some Raman light wavelengths, especially for light wavelengths greater than 1500 nm, it may be advantageous for the loss to be less than 2%, 1%, or 0.2%, for example. Conversely, for short wavelengths it may be advantageous for the loss to be more than 2% or 1%, for example.

Absorption and scattering losses of the Raman medium may substantially reduce device 10 performance. The Raman medium 16 of device 10 has absorption and scattering losses that reduce the resonating Raman light's power by less than 2% per pass through the Raman medium. Other embodiments may have a Raman medium loss of less than 1%, 0.5% or even 0.1% which may facilitate continuous wave or quasi-continuous wave Raman light generation, especially at infrared and mid-infrared wavelengths at which the Raman gain is relatively low. In the embodiment of FIG. 1, the Raman medium is a low nitrogen, ultra low birefringence IIa CVD single crystal diamond. In other embodiments, however, the Raman medium may comprise at least one of barium tungstate, a vanadate such as yttrium vanadate or gadolinium vanadate, silicon or any other suitable Raman medium.

Diamond has a high thermal conductivity, generally greater than 1000 W/m/k, and low thermal expansion coefficient making it suitable for some high-power infrared Raman light generation embodiments. The Raman interaction in the Diamond 16 may generate around or more than 100 W of heat. This may occur for embodiments where the light has an average power greater than, say, 500 W or 1000 W.

In addition to its favourable thermal properties, at light wavelengths of 1000 nm the Raman gain coefficient may be greater than 3 cm/GW or 8 cm/GW. The diamond may be oriented with respect to the resonating structure such that the Raman light when so generated propagates along a <110> axis of the diamond, and the polarisation vector of the Raman light may be aligned with a <111> axis of the diamond.

The applicants have found that using light having a line width less than or approximately equal to that of the Raman gain spectrum (approximately 1.5 cm$^{-1}$) results in a more gain. For example, the light source 11 is arranged to provide light having a line width of less than 2 cm$^{-1}$, but a light source having a line width of less than at least one of 10 cm$^{-1}$, 2.0 cm$^{-1}$, 1.5 cm$^{-1}$, 1.0 cm$^{-1}$ 0.5 cm$^{-1}$, and 0.2 cm may improve efficiency and may have other benefits. Any suitable commercial source may be used.

The resonating structure 14 of device 10, but not necessarily of all embodiments, is in the form of two spaced apart mirrors 20 and 22. The mirrors 20 and 22 each comprise a silica mirror blank having a suitable reflective coating in the form of a dielectric coating, but any suitable coating or mirror blank may be used. The dielectric coating of mirror 20 is highly transmissive of the light 12 (generally but not necessarily greater than 80% transmissive) and highly reflective of the resonating Raman light 18 (generally but not necessarily greater than 99% reflective). The dielectric coating of mirror 22 is reflective of the light 12 (for the light to make a double pass through the Raman medium) and partially transmissive of the resonating Raman light 18. The mirror 22 functions as a Raman light optical port or output coupler that lets less than 2% of the resonating Raman light energy out of the resonating structure per resonance cycle. In other embodiments, especially low gain continuous wave or quasi-continuous wave embodiments at infrared or mid infrared wavelengths, it may be advantageous for the loss of the optical port to be configured to be less than 1%, 0.5%, or 0.1% to enhance the Raman interaction. Conversely, for short wavelengths it may be advantageous for the loss to be more than 2% or 1%, for example.

The resonating Raman light 18 of the embodiment of FIG. 1 is a first Stokes generated by the Raman interaction. In another embodiment, the resonator may be configured to confine the first Stokes such that the first Stokes interacts with the Raman medium to generate a second Stokes. For example, mirrors 20 and 22 may be highly reflective (>99.9% for example) of the first Stokes. Mirror 22 may be partially transmissive of the second Stokes and mirror 20 may be highly reflective of the second Stokes. Mirror 22 may be partially transmissive of the third Stokes and mirror 20 may be highly reflective of the first and second Stokes, and so on.

The resonating Raman light loss in a resonance cycle period may be from several loss sources. The distribution of the losses between the sources is generally not as important as the net loss, and that the net loss from the several loss sources is less than 5%. In the device 10 for example, but not necessarily in all embodiments, the losses are predominantly from the input coupler 20 for the light 12, Raman medium surface losses, Raman medium bulk loses, and the output coupler 22. Specifically, the losses are 0.01% from the input coupler 20, 0.2% per pass through a Raman medium surface, 0.17%/cm (for the 0.95 cm interaction length in the Raman medium) and 0.4% for the output coupler 22. Consequently, for the embodiment of the device 10 of FIG. 1, the resonating Raman light loss in a resonance cycle period is 0.01+0.2*4+0.17*0.95*2+0.4=1.53%. Any one of the components may be configured with a different loss value, however, so that the Raman light loss in a resonance cycle period is less that 5%. Lower losses, in particular lower bulk Raman medium loseses (for example diamond bulk losses in the embodiments having a diamond Raman medium), may improve performance of the device 10. The components of the embodiments of FIGS. 2 and 3 may be configured to have similar values for loss, or alternative values for loss as appropriate. In some embodiment, loss sources other than those mentioned above, for example higher order Stokes generation or nonlinear frequency conversion of the first stokes, are loss sources for resonating Raman light that may need to be considered.

Figure 2:
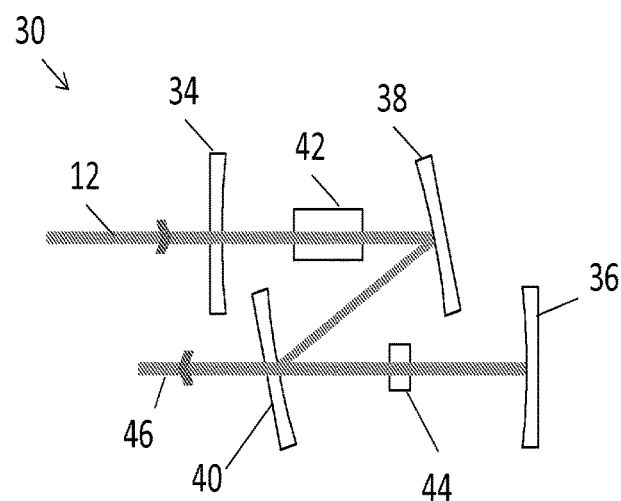
FIG. 2 is a schematic diagram of another embodiment of a device for converting a light received thereby.

FIG. 2 is a schematic diagram of another embodiment of a device 30 for converting a light 12 received thereby. The resonating structure of device 30 comprises end mirrors 34 and 36 and mirrors 38 and 40 optically disposed between the end mirrors to define a Z geometry. Mirror 34 is highly reflective of the Raman light (the "Stokes") and highly transmissive of the light ("pump light"). Mirror 38 is highly reflective of the light and Stokes. Mirror 40 is highly reflective of the light, the Raman light, and highly transmissive, such as at least 50%, of another light 46 generated by another nonlinear interaction in the resonating structure. Mirror 36 is highly reflective of the light, the Raman light and the other light. A Raman medium 42, for example a diamond crystal, is disposed in one arm of the Z resonator and disposed in the other arm of the Z resonator is a second order nonlinear medium 44 arranged for interacting with at least one of the light and the Raman light to generate the other light. The second order nonlinear medium may be cut or tuned and configured with respect to the resonator to frequency double the Raman light. For example, the light may have a wavelength of 1064 nm (that of a Nd:YAG laser light source, for example), the Raman light may have a wavelength of 1240 nm, and the other light may be 620 nm. Alternatively, the second order nonlinear crystal may be configured or tuned such that the other light frequency is the sum or difference of the light and Raman light frequencies. It will be appreciated that the above approach is applicable to a wide variety of frequencies from the ultraviolet to the infrared, and a wide range of types of nonlinear interactions, for example four-wave mixing.

Figure 3:
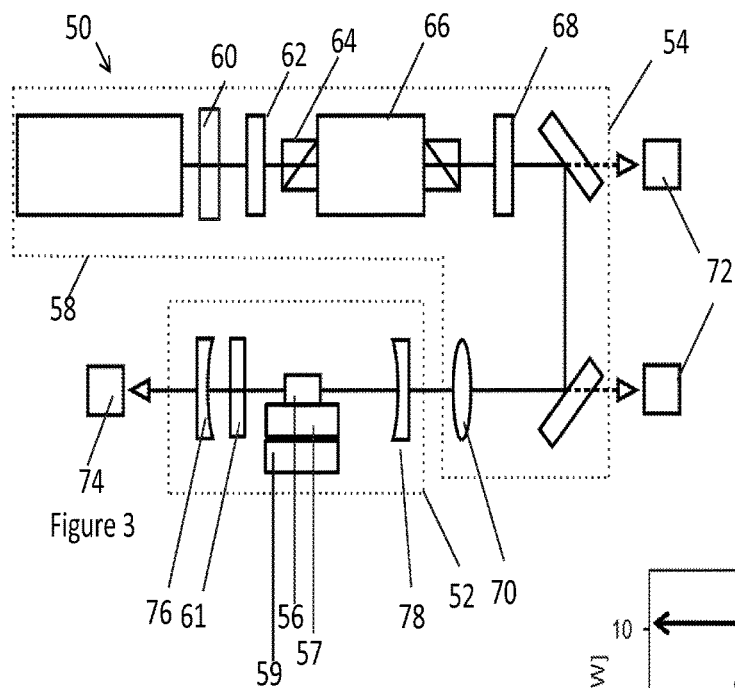
FIG. 3 shows a schematic diagram of an embodiment of a laser system comprising another embodiment of a device for converting light received thereby, and an example laser source that generates the light.

FIG. 3 shows a schematic diagram of an embodiment of a laser system 50 comprising another embodiment of a device 52 for converting light received thereby, and a laser source 54 that generates the light. The device 52 is in the form of an external resonator cw diamond Raman laser operating at 1240 nm. The light source 54 is in the form of a 1064 nm Nd:YVO$_4$ laser. The Raman medium, in this embodiment, is a low loss diamond material 56 thermally coupled to a Raman material cooling element, specifically mounted on a copper heat sink 57. The heat sink may be fluid cooled. The threshold of Raman light generation was at 11.3 W of incident light. A slope efficiency of approximately 50% was achieved. As far as the applicant is aware, 10.1 W represents the highest achieved cw crystalline Raman laser power.

The diamond crystal was a low-nitrogen, ultra low birefringence, Type IIa CVD single crystal diamond (Element6 Ltd) of dimensions 5×9.5×1.2 mm$^3$. A anti-reflective coating, in the form of a dielectric stack, was applied to the end faces (R=1% at 1064 nm, R=0.2% at 1240 nm). The linearly polarized pump beam was incident on the 5×1.2 mm diamond face and propagated along the <110> axis.

The light source 50 (the "pump") comprises a continuous wave Nd:YVO$_4$ laser 58 generating linearly polarized output at 1064 nm with an M$^2$ of approximately 1.7 at maximum output power. A telescope 60 with magnification of 5 was used for beam expansion and collimation. A half wave plate 62 and polarizer 64 served as a pump power attenuator. After passing through an optical isolator 66 a half wave plate 68 was used to align the polarization vector of the pump with the diamond's<111> axis to access a highest gain. In order to reach the threshold of the stimulated Raman scattering a focusing lens 70 of focal length of f=50 mm was used to focus the pump in the diamond. The focal spot diameter (at 1/e$^2$) inside the diamond was 60 μm resulting in an incident intensity of approximately 0.8 MW/cm$^2$ at the threshold of Raman light generation. The pump, residual pump, and Stokes powers were measured by calibrated PIN photodiodes 72 and power meter 74.

The resonating structure of device 52 comprises a 105 mm long quasi-concentric resonator comprised of two reflective surfaces in the form of concave mirrors 76,78 with 50 mm radius of curvature. In use the concave mirrors 76, 78 assisted to mode-matching the Raman oscillator and pump waist sizes. The input coupler 78 was highly transmissive (T=96%) at the pump wavelength and highly reflective (R=99.99%) at the 1st Stokes wavelength of 1240 nm. The output coupler 76 was highly reflective at 1064 nm to provide a double pass pumping, and had 0.4% transmission at the 1st Stokes wavelength. Some embodiments, however, only employ single pass pumping, relaxing mirror design specifications. To prevent the generation of the 2nd Stokes component the mirrors' reflectivities at 1485 nm were minimized. Other embodiments may, however, be optimised for generation at the second Stokes by, for example, maximising the mirror's reflectivity's at 1485 nm.

In some embodiments, the resonator is arranged for the Raman light 18 to follow a zig-zag path through the Raman medium to distribute the heat generated within the crystal, which may reduce thermal effects. The light 12 may follow the same zig-zag path.

FIG. 20 shows another embodiment where the resonating structure comprises a ring resonator 78, wherein parts similar in form and/or function to those of FIG. 1 are similarly numbered. The resonating structure 78 comprises at least three mirrors 80. One of the plurality of mirrors is configured for ingress of the light 12 into the resonating structure for interaction with the Raman medium 16, and one of the plurality of mirrors is configured for egress of the Raman light 18 generated. The mirrors may be configured by way of suitable dielectric stack coating, for example, having any suitable reflectivity's including those disclosed herein.

The chosen crystal orientation with respect to the Raman light propagation direction generally, but not necessarily, depends on the directional gain dependence of the crystal, and also on the directional properties of the grown diamond sample. CVD-growth of diamond, for example, is usually fastest in the <100> direction. The lowest residual birefringence may be in directions perpendicular to the growth. In order to access high gain and lowest depolarization loss, it is therefore most convenient to place the Raman light axis along a <110> direction and the polarization parallel to the <111>. Propagation along other axes is possible without major compromises in gain. However, for designs requiring a long transit path through the material, there may be large cost differences according to the anisotropic growth rates, and due to difficulties in polishing harder facets such as the {111}.

The amount of residual birefringence in the sample also influences design. The use of Brewster facetted crystals may lead to large losses unless the retardance (Δnl/λ) upon transit through the crystal is much less than π/4. The use of anti-reflection coated facets may avoid this problem; however, depolarization may still reduce the effective gain as well as affect the polarization purity of the output beam. These effects will be exacerbated in high finesse of resonators, such as those used in CW lasers, in which the average photon lifetime in the cavity corresponds to a large number of passes in the crystal.

Figure 6:
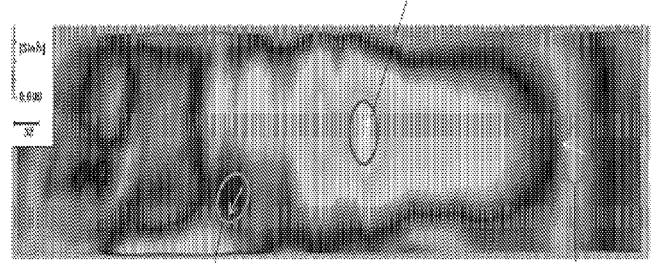
FIG. 6 shows a birefringence map for light propagating through an example Raman medium.

Birefringence is a function of position in the crystal, which is believed to result from internal stress in the crystal. FIG. 6 shows a birefringence map for light propagating through the end facets of an example Raman crystal in the form of a diamond crystal. Each crystal will have its own map according to the particular stresses formed in that crystal during the growth and any subsequent annealing. The map highlights several areas in a crystal with varying birefringence values and where the arrow indicates the fast axis directions. Laser operation is likely to be more efficient in regions of lowest birefringence or in regions where the output polarization is parallel to the fast axis. Consequently, it may be desirable to translate the crystal so that the Raman light propagates through a region of the Raman medium having a birefringence less than that of another region of the Raman medium. The device may have a translator 59 operationally coupled to the Raman medium and operable to translate the crystal. The translator may take the form of, for example, a linear motor translator, a screw translator, or generally any suitable translator. Alternatively or additionally, the resonating structure may have an optional wave plate 61 arranged to at least in part to negate the birefringence of the region of the Raman medium through which the Raman light propagates.

Figure 4:
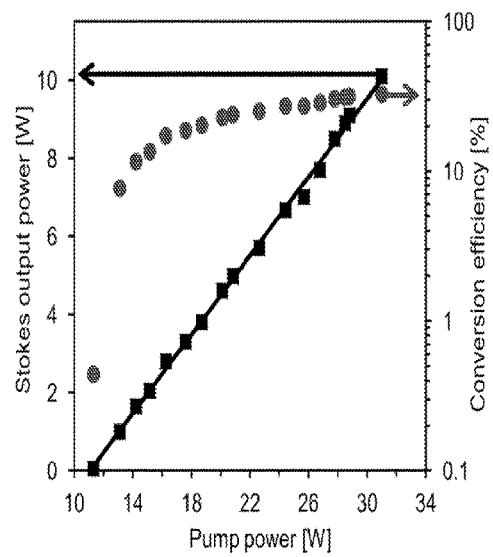
FIG. 4 shows a Raman light output power as a function of a pump light power for the laser system of FIG. 3.

FIG. 4 shows the Raman light ("Stokes") output power as a function of the power of the light ("pump light"). Above the threshold the Stokes output power increased linearly with input power. The maximum output power reached 10.1 W with 31 W of input power. Over the operating range, the residual pump power remained approximately constant at around 10 W. The conversion efficiency at maximum power was 31.7%. The M$^2$ parameter was 1.7 for the pump light and 1.16 for the Stokes light. As no power roll off was observed, and because diamond has excellent thermal properties, it is expected that much higher output powers can be generated by increasing the pump power.

Figure 21:
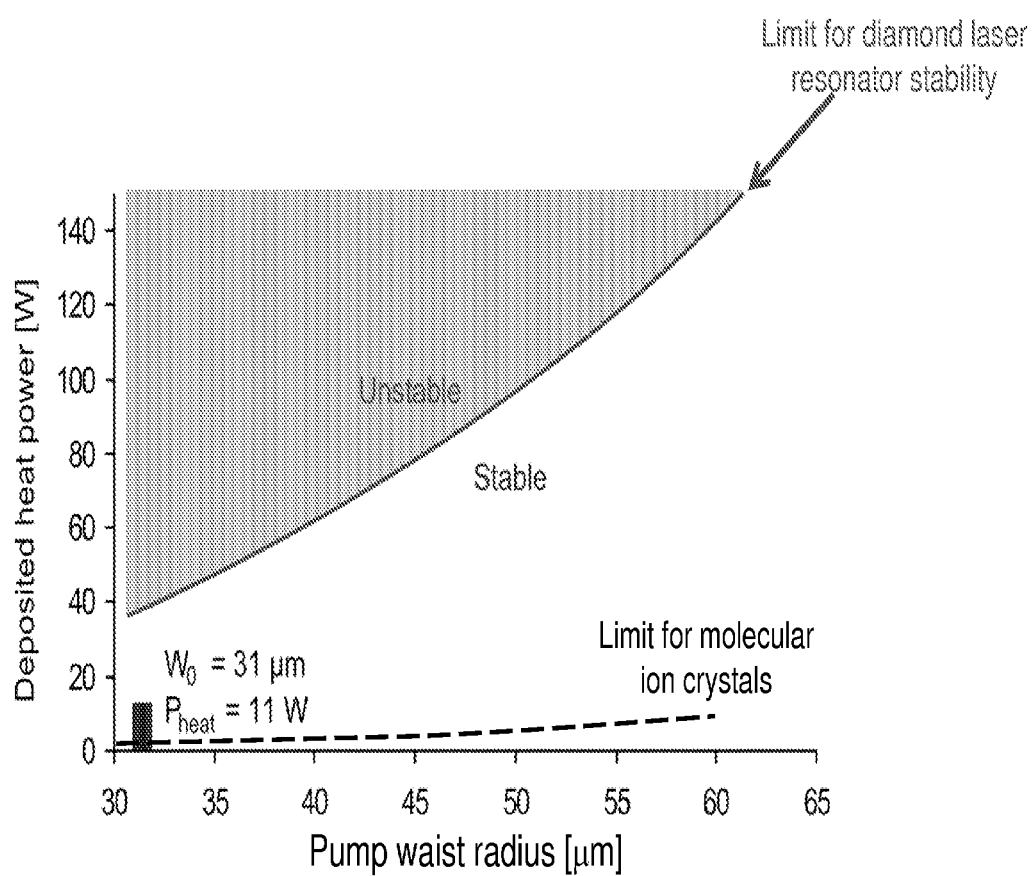
FIG. 21 shows the resonating structure stability as a function of heat deposition in the Raman crystal and pump waist size for the laser conditions of FIG. 4.

The output power is expected to increase with input power until the thermal lens in the Raman crystal grows to level at which it affects laser efficiency. Laser efficiency may drop for a large thermal loads because the Stokes mode size is reduced worsening the spatial overlap of the Stokes mode with the pump, or due to beam aberrations induced in the thermal lens. The resonator mirror spacing may be changed to improve the overlap and laser efficiency, and thereby at least partially compensating for the lens effect. However, at a certain higher power level and stronger thermal lens the resonator becomes unstable for the given mirror curvatures, and thus the system has a power limit. One method to enable higher power limits is to use mirrors of shorter radius of curvature. Another method is to use a larger pump spot size in the Raman crystal. FIG. 21 shows the resonating structure stability as a function of heat deposition in the Raman crystal and pump waist size for the laser conditions of FIG. 4. Here the power limit was calculated from the relation between the power deposition and lens strength, using the thermal lens equation on page 21, and the calculated maximum lens strength for the mirror set. Using larger waist sizes enable much higher powers before the power limit is reached. The plot also shows the case for molecular ion crystals that have much lower limits according to their lower thermal conductivity.

Simultaneous measurement of the pump power, back reflected residual pump power and generated Stokes output power enabled the total resonator losses to be deduced. From the pump depletion, representing the difference between pump and residual pump upon alignment of the resonating structure, the power coupled into the Stokes and phonon fields were determined. Of the depleted pump power (21.8 W), 14.2% is diverted to the excitation of optical phonons (3.2 W) and the remainder is attributed to the generation of the intracavity Stokes field (18.7 W). Since the measured Stokes output (10.1 W) was 54% of the Stokes generated, the difference (8.6 W) represents the combined scatter and parasitic absorption loss. Reducing scattering and absorption losses may improve performance. Table 1 is a list indicating the allocation of power through the system.

TABLE 1

The allocation of power through the system.

|  | Power [W] | Power fraction [%] |
|---|---|---|
| Input power | 31.0 |  |
| Pump depletion | 21.8 | 70% of pump |
| Residual pump | 9.2 | 30% of pump |
| Stokes generated | 18.7 | 86% of depletion |
| Loss due to phonons | 3.2 | 14% of depletion |
| Stokes output | 10.1 | 54% of Stokes generated |
| Absorption and scatter loss | 8.6 | 46% of Stokes generated |

At output powers above about twice the threshold power the loss fraction (46%) of the generated Stokes power was constant as a function of pump power suggesting linear absorption and scatter loss processes dominated. Using the known output coupler transmission (T=0.4±0.1%) the Stokes power circulating in the Raman cavity can be calculated and combined absorption and scatter coefficient of the diamond deduced at these pump levels. The average higher bound of the loss coefficient of the diamond sample was estimated to be 0.17±0.05%/cm at 1240 nm, which is close to the typical absorption coefficient value (0.1%/cm at 1064 nm) for very low nitrogen (generally no more than approximately 100 ppb) material.

Although slightly higher efficiency may be obtained by optimizing the output coupling, the results of this study show that the major limitation for this configuration is likely to be bulk diamond loss. Assuming advances in the CVD diamond's growth process we expect Raman laser efficiency (and consequently power for a given pump light) to substantially improve in the future.

The heat deposited in the Raman crystals consists of the inelastic loss due to Raman shift, which was about 3 W for the diamond laser described above, and residual absorption (which was up to 8.5 W in the above case). The superior thermal conductivity and low thermal expansion coefficient of diamond, combined with concentric resonator design act to diminish the impact of these effects as the device is scaled to higher powers. The high thermal shock parameter for diamond holds promise for scaling to high power without catastrophic damage It is expected that other high thermal conductivity Raman media, such as tungstate, molybdate and vanadates crystals may be similarly used to obtain high Raman light powers.

In an embodiment, the external cavity design may be a simple add-on applicable to a variety of high power continuous wave laser technologies (including tunable or fixed wavelength fiber lasers) for broadening their wavelength range via Stokes cascading and optional subsequent harmonic conversion.

Diamond's relatively high gain, high thermal conductivity and low thermal expansion coefficient may provide even higher power wavelength converters with very low frequency broadening, high brightness and beam quality, which make them well suited for subsequent harmonic conversion. For example, the fracture strength of diamond is relatively high. The thermal shock parameter R [W/cm] and the power limit for fracture $P_{lim}$ [W] are often used to characterize the crystal fracture limits for optically pumped lasers. These two parameters are related by $P_{lim}=4\cdot\pi\cdot R/\alpha$, where $\alpha$ is the inverse of the crystal length in which most power is deposited. The power limit $P_{lim}$ is the power deposited in the crystal when fracturing might occur. Order of magnitude comparisons with other materials can be made. For vanadate, R=4.8 W/cm, where for diamond R=7×10$^4$ W/cm. Consequently, $P_{lim}$ for diamond is approximately 10$^4$ times higher.

Diamond consists of two interpenetrating face-centred cubic lattices displaced by one quarter of the cube diagonal with symmetry properties in the International Symbol system class Fd$\overline{3}$m. The unit cell contains 8 atoms in the cube of side dimension 0.36 nm, and is the most atomically dense of all solids. The symmetry and strong covalent bonding of the lattice constrains the optical phonon spectrum to frequencies greater than 1000 cm$^{-1}$. Indeed the Debye temperature (2200 K), which marks the temperature for which the occupation number of optical phonons becomes significant, greatly exceeds that of most other insulating materials. Diamond's extremely low thermal resistance and low expansion coefficient are consequences of the high Debye temperature. The first-order Raman spectrum contains only the single triply-degenerate feature at 1332.3 cm$^{-1}$ corresponding to displacements between the two interpenetrating cubic lattices along the linking diagonal bond. The linewidth is approximately 1.5 cm$^{-1}$. Symmetry thwarts the first-order lattice absorption that normally provides the long-wavelength transmission limit of most materials. As a result, diamond transmits at all wavelengths less than the bandgap with an exception in the 3-6 μm region where moderate absorption (<10 cm$^{-1}$) prevails as a result of allowed higher-order multi-phonon processes. It has a wide-bandgap (indirect gap 5.47 eV) providing transmission up to 225 nm. Being a cubic lattice, the linear optical properties are isotropic.

The specific output power and wavelength required for an application are parameters that determine the best choice of Raman material. Some of the optical and physical properties of import to Raman laser design and performance are summarized in Table 1 along with examples for other commonly used Raman crystals representing the alkali nitrates (or iodate), single-metal tungstates, double metal tungstates and metal vanadates. The phonon dephasing time $T_2$ and the linewidth $\Delta v$ are related through $T_2 = (\pi \Delta v)^{-1}$. At first glance, the outstanding features of diamond are its high thermal conductivity, low thermal expansion coefficient, wide transmission range, and large Raman shift. Diamond's ability to be an important Raman laser material is given by a large number of other variables including its capacity to rapidly dissipate heat, robustness, absorption, scatter as well as practical aspects such as manufacturability with robust optical coatings. Thermal conductivity may be a function of temperature, and generally decreases for most materials at higher temperature. Thus, using naturally higher thermal conductivity materials, for example diamond, may prevent 'thermal runaway' that may occur when some other Raman media are used, whereby a temperature increase reduces the ability of the Raman medium to transport heat away, further increasing the Raman medium's temperature.

It may be desirable to have a loss below a certain upper limit to enable optimal operation. An estimate for the upper limit can be derived from the expression Loss [%]<100[exp $(2I_{in} \cdot g' \cdot l/\lambda_s) - 1$], where $I_{in}$ is the intensity of the received light in the crystal, $g'/\lambda_s$ is the Raman gain coefficient (where $g'$ is approximately independent of the Stokes wavelength $\lambda_s$), and l is the crystal length). It can be seen that the upper limit to the loss increases with the received light power and inversely with the Stokes wavelength. In one example, $g'/\lambda = 10$ cm/GW, l=1 cm and $I_{in} = 0.8$ MW/cm$^2$ and the maximum loss is 1.6%. An output coupling of around 0.5% may be used with other resonator losses of approximately 0.4% per round trip (combined absorption and scattering loses in diamond), providing the total round trip losses of about 1%, with satisfactory performance.

In order to determine the approximate power limits for various Raman crystals, the thermal lens strength and its effect on resonator stability was calculated for several example materials.

The thermal lens in the crystal was determined by calculating the heat deposition in the crystal due to absorption of the Raman crystal and to generation of the optical phonons by the Raman process. It is assumed that the power is converted to heat in the crystal with the same spatial

TABLE 1

Comparison of material parameters at room temperature.

| Material | Diamond | Silicon | LiIO$_3$ | Ba(NO$_3$)$_2$ | KGW | BaWO$_4$ | YVO$_4$ |
|---|---|---|---|---|---|---|---|
| Crystal/optical class | Cubic/ isotropic | Cubic/ isotropic | Hexagonal/ −uniaxial | Cubic/ isotropic | Monoclinic/ biaxial | Tetragonal/ +uniaxial | Tetragonal/ +uniaxial |
| Raman Shift | 1332.3 | 521 | 770, 822 | 1047.3 | 768, 901 | 926.5 | 890 |
| Raman linewidth FWHM (cm$^{-1}$) | 1.5 | 1.24 | 5.0 | 0.4 | 7.8, 5.9 | 1.6 | |
| $T_2$ (ps) | 7 | 8.5 | 2.1 | 26 | 1.4, 1.7 | 6 | 3.5 |
| Transmission range (μm) | >0.23 | >1.1 | 0.31-4 | 0.35-1.8 | 0.34-5.5 | 0.28-5 | 0.4-5 |
| dn/dT (10$^{-6}$ K$^{-1}$) | 15 | 215 | −95 −80 | | 0.4 | | 3 (a) 8.5 (c) |
| Thermal conductivity (W/mK) | 2000 | 153 | 4 | 1.17 | 2.6 [100] 3.8 [010] 3.4 [001] | 2.32 2.26 | 5.2 |
| Thermal Expansion (×10$^{-6}$ K$^{-1}$) | 1.1 | 3 | 28 (a) 48 (c) | 18.2 | 4.0 3.6 8.5 | 8.2 8, 9 31.2 | 4.43 |
| Heat capacity (J/gK) | 0.52 | 0.75 | 0.58 | 0.6 | | 0.31 | |
| Refractive index n at 1.064 μm | 2.41 | 3.42 | 1.85 (o) 1.72 (e) | 1.56 | 1.98 p 2.01 m 2.06 g | 1.84 | 1.96 2.17 |
| Density (g/cm$^3$) | 3.52 | 2.33 | 4.5 | 3.25 | 7.3 | 6.4 | 4.23 |
| Raman gain @1064 nm | 10-12 | (20 @1550 nm) | 4.8 | 11 | 3.5 | 8 | 4.5 |
| Growth Method | CVD or HPHT | Czochralski or Float Zone | Aqueous | Aqueous | Flux or Czochralski | Czochralski | Czochralski |
| Density (g/cm$^3$) | 3.52 | | | 3.25 | 7.3 | 6.4 | 4.24 |
| Poisson's Ratio | 0.069 | | | 0.237 | 0.3 (est) | 0.3 (est) | 0.33 |
| Young's modulus (GPa) | 1100 | | | | 115.8 (a) 152.5 (b) 92.4 (c) | | |
| Fracture strength (GPa) | 4 | | | | 0.14 (a) 0.102 (b) 0.064 (c) | | |
| Combined loss coeff @ 1st Stokes (%/cm) | 0.2 (20 ppb) | | | 0.2 | 0.2 | 0.2 | 0.2 |
| Raman gain coefficient @532 nm (cm/GW) | 30 | | 47 | | 20 (est.) | 35 | 25 (est.) | dependence as the Stokes beam. From observation and theoretical analysis, and assuming that above threshold all pump photons are converted to the Stokes, the Stokes output generated for a Raman laser is given to a first approximation by:

$$P_{total} = \frac{\lambda_p}{\lambda_s}(P - P_{th})$$

where $P_{total}$ is the Stokes power generated within the cavity, $\lambda_p$ is the pump wavelength, $\lambda_s$ is the Stokes wavelength, P is pump power (that is the power of the light 12) and $P_{th}$ is threshold pump power. Due to absorption and scatter losses in the crystal, the fraction of this power exiting the resonator is $$P_{out}/P_{total} = \frac{(1 - R_{oc})}{\exp(2\alpha l + 2\ln(1 - L)) - R_{oc}}$$

where $P_{out}$ is the Stokes output power, $R_{oc}$ is the output coupler reflectivity, a is the diamond absorption coefficient l is crystal length and L is additional losses, for example scattering. The power deposited in the crystal $P_{dep}$ is dominated by absorption loss and the generation of phonons. Because the Stokes intensity in the crystal is much higher than the pump, absorption by the Pump can be neglected and $$P_{dep} = \frac{P_{out}}{1 - R_{oc}} \cdot (1 - e^{-2\omega i}) + P_{total}\left(\frac{\omega_P}{\omega_R} - 1\right)$$

where the first part represents loss from the intracavity Stokes field due to absorption and the second part is loss to phonons and depends on material Raman shift, $\omega_{R,P}$ are the Raman and pump angular frequencies. The thermal lens strength as a function of $P_{dep}$ is $$f^{-1} = \frac{P_{dep}}{2\pi\kappa w_0^2}\left(\frac{dn}{dT} + (n - 1)(v + 1)\alpha_T\right)$$

where $w_0$ is the beam radius, v is Poisson's ratio, n is the refractive index, T temperature, $\alpha_T$ is the thermal expansion coefficient, κ is the thermal conductivity. Approximate values for the various materials are in table 1.

Figure 7:
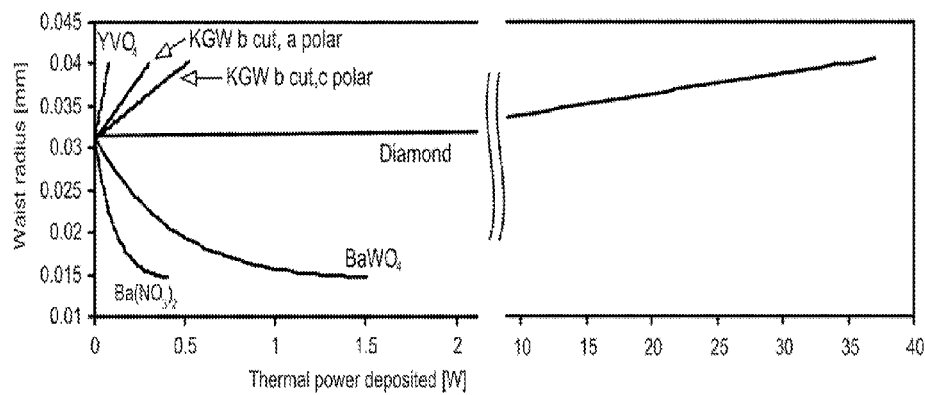
FIG. 7 shows the dependence of waist radius on a deposited thermal power.
Figure 8:
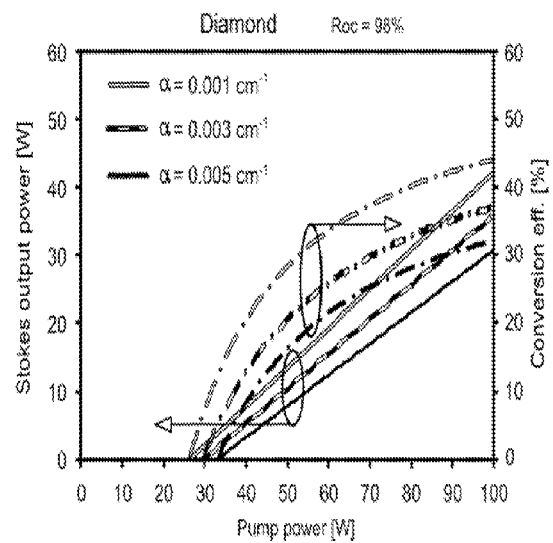
FIGS. 8 to 14 show plots of output power and efficiency vs. a pump power for an embodiment of a device for converting a light received thereby.
Figure 9:
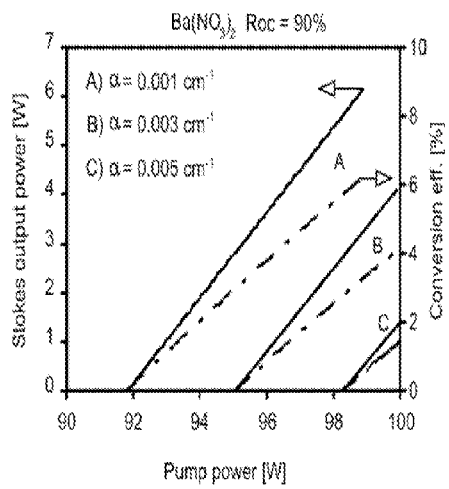
Figure 10:
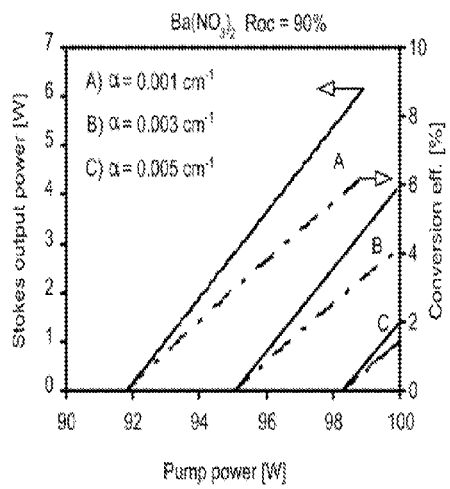
Figure 11:
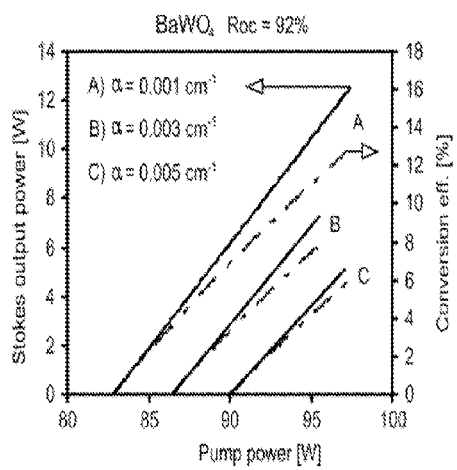
Figure 12:
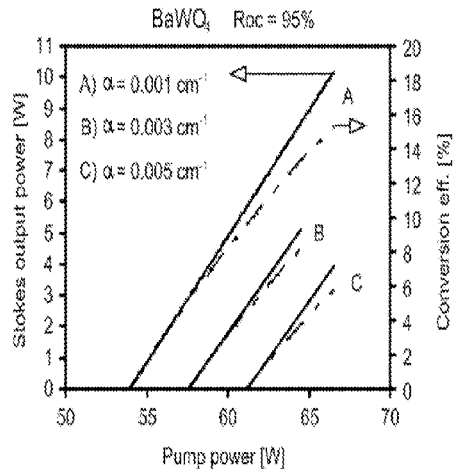
Figure 13:
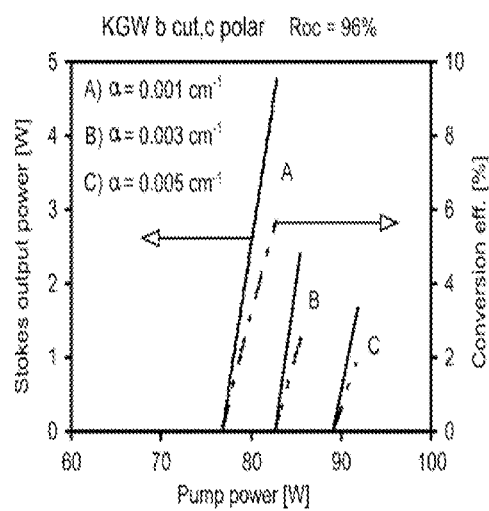
Figure 14:
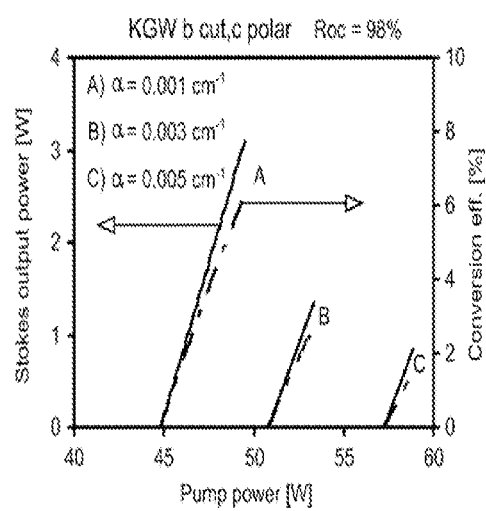

The thermal lens influences the mode size in the Raman crystal and may force the resonator to become unstable. As determined by ABCD matrix beam modeling, the waist radius changes with $P_{dep}$. FIG. 7 shows the dependent of waist radius on deposited thermal power, with the curves being from top to bottom YVO$_4$ a-cut, KGW b-cut a-polar, KGW b-cut c-polar, diamond, BaWO$_4$, and barium nitrate. To enable direct comparison of materials, the calculation has been performed for fixed mirror curvature (radius 5 cm) with crystal length l=1 cm and with a starting (zero heat load) mirror spacing providing a waist radius of 31 μm.

It is seen that the cavity is unstable for $P_{dep}$ greater than 0.1-1.5 W for most materials except diamond. The excellent thermal properties of diamond enable more than 35 W of heat before the cavity becomes unstable.

The output power and efficiency dependence on pump power, derived from the equations above up to the stability limit, is plotted in FIGS. 8 to 14.

The maximum output power shown indicates the point at which the cavity becomes unstable. Operating the laser at powers approaching these levels may result in an efficiency decrease and a laser beam quality reduce. Higher powers may be achieved by using higher curvature mirrors, or by placing mirror coatings on the Raman crystal facets, or by placing a counter-acting intracavity lens inside the resonator. However, the extent to which these strategies are practical may be limited. For example, coated mirrors of short radius of curvature and large diameter are costly or impractical to manufacture. Also, for example, incorporating intracavity lenses may substantially raise the laser threshold, and reduce the stable operating range.

Figure 15:
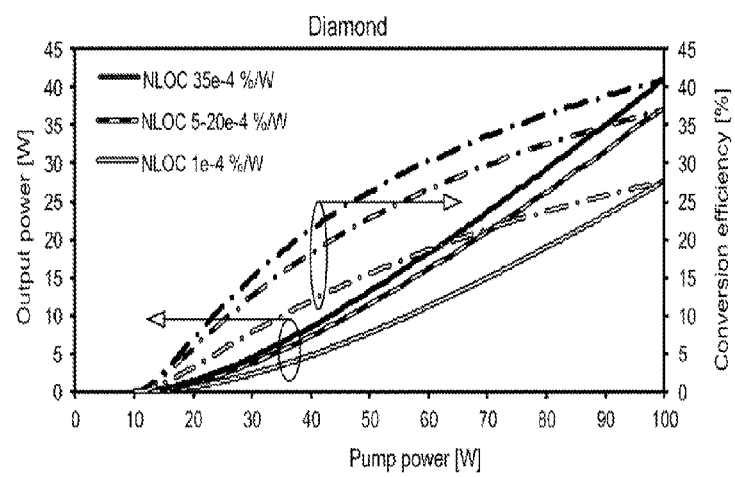
FIG. 15 shows a plot of an example of an optimal nonlinear output coupling coefficient for a resonator with a diamond Raman medium.

The output power was also calculated for the case with intracavity second harmonic generation of the first Stokes to the ultraviolet. In this case, the resonator consists of high reflectors at the pump and Stokes wavelengths, and the harmonic is efficiently outputted from the resonator (see for example FIG. 15, showing optimal nonlinear output coupling coefficient for resonator with diamond). The effective resonator output coupling in this case is a function of the Stokes power.

The above calculations comparing materials was done for the case of a green pump light (532 nm) producing a yellow first Stokes, and at the second harmonic in the ultraviolet. The results are also indicative of the likely power and performance for conversion to from infrared wavelengths to Stokes infrared wavelengths and to visible wavelengths by harmonic generation in a nonlinear medium positioned inside the resonator.

Pumping Raman lasers at green wavelengths may generate Stokes wavelengths at yellow and red wavelengths, and at ultraviolet UV-C and UV-B wavelengths through intracavity harmonic generation. Both these wavelength regions have many important applications, yet are have been found to be challenging to generate using other means. Before an embodiment disclosed herein, high power cw laser sources in the ultraviolet were particularly challenging to realize because of the lack of stable quasi-phase matched frequency conversion elements compatible for the ultraviolet, or the stringent requirements placed on the fundamental laser and harmonic generation optics in the case of cavity enhanced harmonic generation schemes. The enhanced intra-cavity field at a Stokes wavelength created by the Raman gain may enable efficient conversion to the UV using conventional Type I and II phase-matched SFG and SHG. This approach provides a method for building on mature cw green laser technology, such as second-harmonic Nd and Yb lasers, and optically pumped semiconductor lasers, to generate cw UV beams with potentially high efficiency and high power.

Modeling

Mathematical modeling is a useful tool for optimization of laser performance. The model identifies parameters whose change may lead to increased output power or decreased operation threshold.

Laser performance was calculated as a function of laser design parameters by deriving an analytical solution for the Stokes output power. Starting with coupled equations for Stokes and pump intensity growth and decay:

$$\frac{dI_{int}^S(r,z)}{dz} = g_R I^P I_{int}^S - \alpha I_{int}^S \quad (1)$$

$$\frac{dI^P(r,z)}{dz} = -g_0 I^P I_{int}^S - \beta I^P,$$

where $I^S_{int}$ is Stokes intensity in a Raman medium, $I^P$ is pump intensity, $g_{0,R}$ small signal Raman gain at pump, Stokes wavelength respectively, $\alpha$ and $\beta$ absorption losses at Stokes and pump wavelength, which are valid for fields evolving slowly compared to the phonon dephasing time. In order to simplify the analysis, we consider here only the special case in which cascading to the 2nd Stokes is negligible. By assuming that the intensity profiles propagating through the crystal are Gaussian, and given that in the high finesse Stokes cavity the Stokes growth through the crystal for each round trip and its losses due to output coupling and absorption are small, we obtain:

$$P_{in}^P = \frac{\lambda_S}{\lambda_P} \frac{T + 2\alpha L}{T} P_{out}^S \left[1 - \exp\left(-\frac{2G}{T} P_{out}^S\right)\right]^{-1}, \quad (2)$$

where $P^P_{in}$ is pump input power, $P^S_{out}$ Stokes output power, $\lambda_S$, $\lambda_P$ are Stokes and pump wavelengths, T output coupling, L diamond length, $\alpha$ diamond absorption loss, G Raman gain in focused geometry given by:

$$G = \frac{\lambda_S}{\lambda_P} \frac{4gs}{\lambda_S + \lambda_P} \mathrm{atan}\left(\frac{L}{b}\right), \quad (3)$$

where $g_s$ is Raman gain coefficient and b pump Confocal parameter (assumed the same as Stokes).

Figure 16:
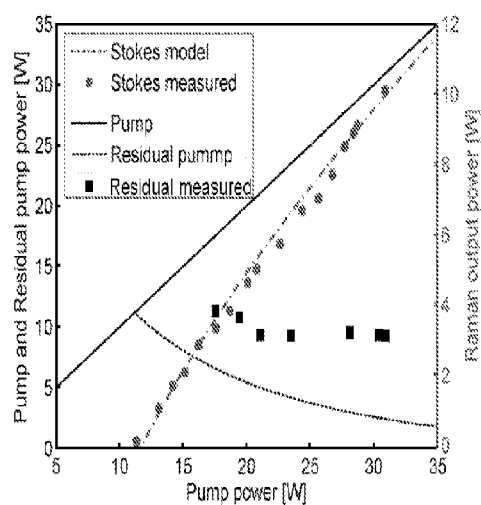
FIG. 16 shows a comparison of an example model with measured data.

Comparison of the model with measured data is shown in FIG. 16 for measured system parameters given in Table A. The model accurately predicts the threshold and Raman laser slope efficiency. Some discrepancy between the model and experiment, particularly in the residual pump power, is caused by assuming a Gaussian shape of residual pump. FIG. 16 shows a comparison of the model with the measured data.

TABLE A

Model initial parameters

| Parameter | Value |
|---|---|
| Crystal length | 9.5 mm |
| Pump waist radius | 32 μm |
| Absorption coefficient | 0.3%/cm |
| Pump wavelength | 1064 nm |
| Stokes wavelength | 1240 nm |
| Raman gain | 8.5 cm/GW |

Figure 17:
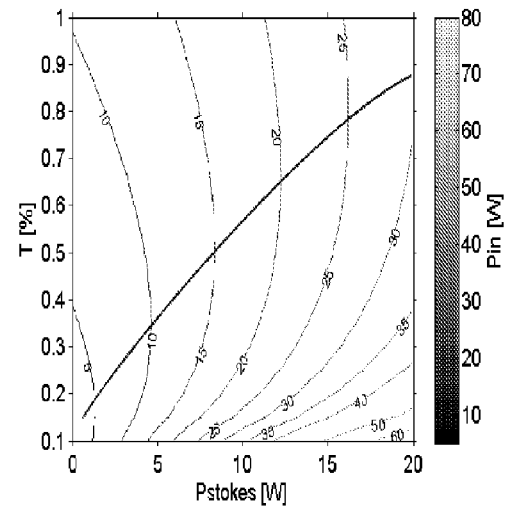
FIG. 17 shows a plot of output coupling as a function of Stokes output power for different pump power levels for an example model.

For each pump power level it is generally possible to find an output coupling maximizing the Stokes output. It is not possible to find a maximum Stokes power of eq. (2) in analytical form. A numerical solution is shown in FIG. 17 for parameters given in Table B, showing output coupling as a function of Stokes output power for different pump power levels. The line originating from the bottom left corner shows optimal 0 C where for a given Stokes output the pump is minimized.

For the current system using diamond the optimal 0 C is between 0.5 and 1% for output powers 10-20 W.

The initial parameters are listed in Table B.

TABLE B

Model initial parameters

| Parameter | Value |
|---|---|
| Crystal length | 9.5 mm |
| Pump waist radius | 25 μm |
| Absorption coefficient | 0.1%/cm |
| Pump wavelength | 1064 nm |
| Stokes wavelength | 1240 nm |
| Raman gain | 8.5 cm/GW |

For a given 0 C the model predicts how the generation threshold depends on changes of various system parameters. The threshold can be calculated when limiting the Stokes output to 0 in eq. (2):

$$P_{thr}^P = \frac{T + 2\alpha L}{2g_s \cdot \mathrm{atan}(C)} D \quad (4)$$

$$C = \frac{L}{\sqrt{b_P b_S}} \sqrt{\frac{b_P \lambda_S + b_S \lambda_P}{b_P \lambda_P + b_S \lambda_S}}$$

$$D = \frac{1}{4}\sqrt{\frac{(b_P \lambda_S + b_S \lambda_P)(b_P \lambda_P + b_S \lambda_S)}{b_P b_S}}$$

where $b_P$ and $b_S$ are confocal parameters of pump and Stokes beams respectively. In eq. (4) we allow for different focusing of the pump and Stokes fields. The confocal parameter is related to pump, Stokes waist radius $w_{0P,S}$ as:

$$b_{P,S} = \frac{2\pi w_{0P,S}^2}{\lambda_{P,S}}. \quad (5)$$

FIG. 18 shows the threshold as a function of pump and Stokes confocal parameters, for parameters given in Table B and 0 C of 0.4%. The optimal ratio of $b_P/b_S$ is predicted to be 0.4. This can be related to the waist radius ratio as:

$$\frac{w_{0P}}{w_{0S}} = \sqrt{0.4 \frac{\lambda_P}{\lambda_S}}, \quad (6)$$

suggesting that the 1064 nm pump waist radius should be ~0.6 times smaller than Stokes 1240 nm waist.

For a given focusing the crystal residual absorption $\alpha$ increases linearly with crystal length L (see eq. (4)). The small signal gain $g_S$ on the other hand is multiplied by a tan(L/b) as a result of strong focusing. For a crystal much longer than the confocal parameter the a tan limits to π/2 and the losses begin to dominate. FIG. 19 shows the threshold as a function of diamond residual absorption and length, and optimal crystal length for laser parameters given in Table B.

At present the diamond samples exhibit residual absorption of 0.1-0.5%/cm. The predicted optimal crystal length for the modeled case of Table B is 7-10 mm. In a similar way, the model can be used to determine the optimal parameters for other system parameters including other values of pump wavelength, crystal absorption and scatter loss, crystal length, mirror curvatures, and other Raman crystals.

The analytical model predictions of threshold and slope efficiency agree with measured Raman laser performance and can be used for system optimization. Optimal output coupling can be found for given pump power or Stokes output desired. Threshold can be minimized with regard to pump and Stokes spot sizes. The model also shows that crystals longer than 1 cm may be counterproductive for diamond material of total absorption and scatter loss of approximately greater than 0.2%/cm.

Figures 22, 23:
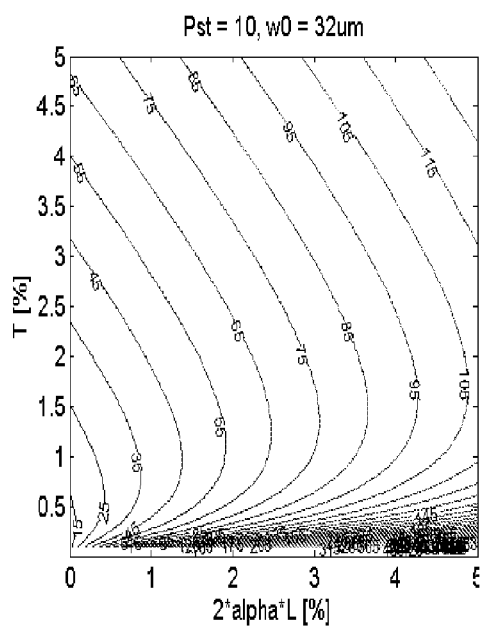
FIGS. 22 and 23 shows a two dimensional plot of the input power required to generate Raman light in the embodiment of FIG. 3.

Resonator loss values higher than 5% are generally problematic as the threshold pump power increases and for a given available pump power the device becomes inefficient. For the example of present device 50 of FIG. 3 that provided around 10 W of Stokes output, the applicants have determined that increasing the resonator loss at the Stokes wavelength from 1.5% to 5% will cause the threshold to increase by approximately 3.3 times to 36 W, which is more than the available pump power for that system. FIG. 22 shows a two dimensional plot of the input power required to generate 10 W of Raman light (Stokes power) as a function of the output coupler and absorption/scatter loss in the diamond based on the model/equations described above (here crystal reflection losses are neglected, but any such losses may be assumed incorporated into output couple loss, for example). The plot of FIG. 22 shows that efficient operation of the embodiment of FIG. 3 (or FIG. 1) corresponds to the lower left hand region of the plot, where the sum output coupling and absorption/scatter loss is less than around 2%, for example no more than 1.5%. The plot indicates that at losses greater than around 5% the device becomes impractical in view of the high pump powers (the power of the light) required. The plot also shows that the output coupling should be small compared to the round trip absorption/scatter loss for highest efficiency. Tighter focusing of the pump beam may enable the threshold to be reduced but this approach has very limited benefit due to the decrease in confocal parameter, and thus effective crystal length, which will have a counteracting affect (refer to FIG. 19). Even if much higher pump lasers than 36 W are used, the optimum output coupling remains below 5% because it becomes necessary to increase the pump spot size to avoid a very large thermal lens (refer to the equation for thermal lens strength on page 22) or possibly also crystal damage. For an example in which a very large pump laser is used to generate 1000 W of Stokes output, and the spot-size area is increased to ensure that the incident intensity remains approximately the same (therefore ameliorating the thermal lens and preventing damage), the optimal loss figure remains less than 2%, for example no more than 1.5% (see FIG. 23). With respect to the embodiments of FIGS. 1 and 3, for example, and the model results in FIGS. 22 and 23, there is some leeway to increase pump power without changing spot size, however, this is expected to be possible only for a power increase of factor 2 or 3 before performance is severely affected by the Stokes resonator approaching the instability limit.

Note that compensation of the thermal lens in the Raman material may be achieved by introducing counteracting lenses in the resonator. This could be achieved in practice by changing the resonator curvature, placing lenses adjacent the Raman material or putting curved surfaces on Raman material. This strategy, however, will lead to an increased laser threshold and greatly reduced laser operating range for a near concentric resonator. In the case of curved surfaces on the Raman material, these are difficult to manufacture.

Variations and/or modifications may be made to the embodiments described without departing from the spirit or ambit of the invention. For example, the source of the light may comprise at least one of a gas laser, a laser having neodymium ions, a laser having ytterbium ions, a laser having holmium ions, a laser having thulium ions, a laser having erbium ions, a tunable laser, a fibre laser, a laser having a solid state laser medium, a laser having bulk crystalline medium, a narrow line-width laser, a diode laser, and a tapered diode laser. Generally any suitable source of light may be used. The light may have a plurality of spatial modes. The light may comprise multiple beams entering the Raman material at different angles. Any suitable source of light may be used. The resonating structure may comprise and etalon. The device may be mode locked. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A device comprising a resonating structure, the resonating structure including:
   a resonator comprised of two reflective mirrors respectively forming an input coupler and an output coupler, the input coupler is at least partially transmissive of a continuous wave light beam at a first frequency that is input from an external light source externally located from the resonating structure; and
   a Raman medium disposed between the input coupler and the output coupler and having a thermal conductivity of greater than 2 W/K/m, the Raman medium configured to generate a Raman light beam through Raman interaction between the Raman medium and the continuous wave light beam, the Raman light beam having a second frequency distinct from the first frequency;
   wherein the input coupler is reflective at the second frequency to resonate the Raman light beam in the resonator; and
   wherein the output coupler is partially transmissive at the second frequency to transmit less than 2% of the resonating Raman light beam in a resonance cycle period of the resonating structure, such that the resonance cycle period of the resonating structure results in a total loss of less than 5% of the resonating Raman light beam thereby facilitating continuous wave Raman light generation.

2. A device defined by claim 1 wherein the Raman medium has a thermal conductivity greater than 5 W/m/K.

3. A device defined by claim 1 wherein the Raman medium has at least one of absorption and scattering losses that reduce the resonating Raman light's power by less than 2% when passed therethrough.

4. A device defined by claim 1 comprising a plurality of spaced apart reflecting surfaces.

5. A device defined by claim 1 wherein the Raman medium is crystalline and comprises at least one element of Group IV of the periodic table.

6. A device defined by claim 1 wherein the Raman medium comprises diamond.

7. A device defined by claim 6 arranged for a polarisation vector of the Raman light to be aligned with a <111> axis of the diamond.

8. A device defined by claim 1 wherein the Raman medium comprises at least one of a tungstate crystal, molybdate and a vanadate crystal.

9. A device defined by claim 1 wherein the continuous wave light has an average power greater than 10 W.

10. A device defined by claim 1 wherein the resonating structure has a second order nonlinear medium arranged for interacting with at least one of the continuous wave light and the Raman light to generate another light.

11. A device defined by claim 10 wherein the resonating structure has a light optical port arranged to pass at least 50% for the other light.

12. A device defined by claim 1 wherein the resonating structure comprises a ring resonator.

13. A device defined by claim 1 wherein the length of the path of the Raman light through the Raman medium is 2 mm to 20 mm.

14. A device defined by claim 1 wherein the diameter of the continuous wave light is 0.5 to 0.7 times smaller than the diameter of the Raman light within the Raman medium.

15. A device defined by claim 1 comprising a Raman medium translator operable to translate to Raman medium to control the effect of Raman medium birefringence on the Raman light.

16. A device defined by claim 15 wherein a major axis of the Raman medium birefringence measured in the direction of propagation is parallel to a <111> axis of the diamond.

17. A laser system comprising a device defined by claim 1 wherein the device and the external light source are cooperatively arranged for the device to receive the continuous wave light, wherein the external light source comprises at least one of a gas laser, a laser having neodymium ions, a laser having ytterbium ions, a laser having holmium ions, a laser having thulium ions, a laser having erbium ions, a tunable laser, a fibre laser, an optically pumped semiconductor laser, a diode pumped alkali vapour laser, a chemical laser, a laser having a solid state laser medium, a laser having a bulk crystalline medium, a narrow line width laser, a diode laser, and a tapered diode laser.

18. A laser system defined by claim 17 wherein the external light source is arranged to provide the continuous wave light having a line width of less than or approximately equal to the gain linewidth of the Raman medium.

19. A device defined by claim 1 wherein a waist radius of the continuous wave light at the Raman medium is less than 75 microns.

20. A method for converting a continuous wave light to a continuous wave Raman light, the method comprising the steps of:
transmitting the continuous wave light beam at a first frequency through an input coupler, wherein the continuous wave light beam is received from an external light source externally located from a device, the device including a resonating structure, wherein the resonating structure includes a Raman medium disposed between the input coupler and an output coupler;
interacting the continuous wave light beam with the Raman medium to generate a Raman light beam having a second frequency distinct from the first frequency, the Raman medium having a thermal conductivity of greater than 2 W/K/m, wherein the output coupler is partially transmissive at the second frequency to transmit less than 2% of the resonating Raman light beam in a resonance cycle period of the resonating Raman light beam; and
resonating the Raman light generated such that a total loss of less than 5% of the resonating Raman light beam is achieved in the resonance cycle period of the resonating Raman light thereby facilitating continuous wave Raman light generation.

21. A method defined by claim 20 wherein the Raman medium is crystalline and comprises at least one element of Group IV of the periodic table.

22. A method defined by claim 20 wherein the Raman medium comprises diamond.

23. A method defined by claim 20 wherein the continuous wave light has an average power greater than 5 W.

24. A method defined by claim 20 comprising the step of interacting at least one of the resonating Raman light and the continuous wave light with a second order nonlinear medium to generate another light.

25. A method defined by claim 20 wherein the length of the path of the Raman light through the Raman medium is 2 mm to 20 mm.

26. A method defined by claim 20 wherein the diameter of the continuous wave light is 0.5 to 0.7 times smaller than the diameter of the Raman light within the Raman medium.

27. A method defined by claim 20 comprising the step of translating the Raman medium to control the effect of Raman medium birefringence on the Raman light.

28. A method defined by claim 27 wherein a major axis of the Raman medium birefringence measured in the direction of propagation is parallel to a <111> axis of the diamond.

29. A laser system comprising:
an external light source externally located from a device, wherein the external light source is configured to emit a continuous wave light beam at a first frequency;
the device including a resonating structure, wherein the resonating structure includes:
a resonator comprised of two reflective mirrors respectively forming an input coupler and an output coupler;
a Raman medium disposed between the input coupler and the output coupler and having a thermal conductivity of greater than 2 W/K/m, wherein the Raman medium is configured to generate a Raman light beam through Raman interaction between the Raman medium and the continuous wave light beam, the Raman light beam having a second frequency distinct from the first frequency;
wherein the input coupler is transmissive at the first frequency to transmit the continuous wave light beam and reflective at the second frequency to resonate the Raman light beam;
wherein the output coupler is partially transmissive at the second frequency to transmit less than 2% of the resonating Raman light beam in a resonance cycle period of the resonating structure, such that the resonance cycle period of the resonating structure results in a total loss of less than 5% of the resonating Raman light beam thereby facilitating continuous wave Raman light generation.

* * * * *

UNITED STATES PATENT AND TRADEMARK OFFICE
CERTIFICATE OF CORRECTION

| | |
|---|---|
| PATENT NO. | : 9,658,513 B2 |
| APPLICATION NO. | : 14/395751 |
| DATED | : May 23, 2017 |
| INVENTOR(S) | : Richard Paul Mildren et al. |

It is certified that error appears in the above-identified patent and that said Letters Patent is hereby corrected as shown below:

On the Title Page

Column 1, item (73) should read as follows:
(73) Assignee: Macquarie University, North Ryde (AU)

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*